June 18, 1929.   H. E. IVES   1,717,781
PICTURE TRANSMISSION SYSTEM
Filed March 26, 1926

Inventor:
Herbert E. Ives
by J. E. Roberts  Atty

Patented June 18, 1929.

1,717,781

UNITED STATES PATENT OFFICE.

HERBERT E. IVES, OF MONTCLAIR, NEW JERSEY, ASSIGNOR TO BELL TELEPHONE LABORATORIES, INCORPORATED, OF NEW YORK, N. Y., A CORPORATION OF NEW YORK.

PICTURE-TRANSMISSION SYSTEM.

Application filed March 26, 1926. Serial No. 97,659.

This invention relates to picture transmission systems.

An object of this invention is to control the tone characteristic of the received picture in such a manner that the distortion inherent in a single photographic operation is compensated for and thereby one photographic operation is eliminated.

A feature of this invention is a special apertured diaphragm or screen or a special light wedge screen placed in the optical portion of the system at the receiving end.

A further feature is the employment of an optical system in which the jaws of the light valve are removed by optical means to a point in space outside the light valve proper, thus producing a virtual light valve, and the positioning of the special screen at the virtual light valve. The special screen may however be placed at the light valve, though when so positioned it is not as accessible and must be considerably smaller.

The electrical picture transmission systems now in general operation have a linear characteristic and a strictly rectilinear relation is maintained between the light incident at the sending end and the light received from the apparatus at the receiving end. The pictures to be transmitted are placed on the sending apparatus usually in the form of a positive transparency and are received as a negative from which photographic positive prints are made in turn. This procedure is adhered to in order to secure correct tone rendering as two photographic operations are necessary to secure proper tone reproduction, as is subsequently explained.

The photographic process reproduces in general in a reciprocal instead of a complemental manner and it is, therefore always necessary in photography to go through two photographic operations, namely, negative and positive, to reproduce the tone values of the original object. It is by the proper matching of the characteristics of the negative and the positive that a correct linear reproduction is obtained and it is required that the photographic operations be performed always in pairs. This characteristic of the photographic process puts certain limitations upon the flexibility of picture transmission. Thus if the film at the sending end is a positive, a negative must be received, from which prints must in turn be made; and if a negative is used in sending, a positive is received. The limitations just given apply to the method of reproduction in which the picture is built up of lines of variable density. Where lines or other elements of variable size but of constant density are used, positives may be received from positives by reversing the photoelectric cell connections. Negatives, however, cannot be received from negatives for, although they look like the originals when viewed under conditions such that the structure is invisible, they will not print in the same manner.

In order to shorten the overall time in picture transmission and for other obvious reasons it is desirable to eliminate one photographic operation, and this may be accomplished by means which overcome the limitations of the photographic process which require two operations for correct tone rendering. One essential step is to have the sending apparatus so connected that the two ends of the tone scale are rendered as of the values of those at the sending end, namely, blacks must be rendered as blacks and whites must be rendered as whites. Since the photographic process reproduces in general in a reciprocal manner, as already pointed out, the problem becomes one of so warping the characteristics of the picture transmission system between these end points that the non-linear characteristic inherent in the photographic process when carried through only one of the two operations is compensated for. One method of doing this is to warp the electrical characteristics, which can be done by setting the two picture end points on a curved portion of the modulator characteristic. Similar distortion might be introduced elsewhere. The method which is the subject of this invention consists of distorting the illumination current relation of the light valve by diaphragms or screens or light absorbing wedges over the light valve opening, thereby causing optical distortion. The application of this method is facilitated by the adoption of an optical system in which the jaws of the light valve are removed by optical means to a point outside of the light valve proper, designated as the virtual light valve, being made thereby easily accessible and at the same time of considerably larger size than when located inside the valve.

The method of introducing optical distortion disclosed herein comprises placing diaphragms or screens or light absorbing wedges over the aperture of the light valve or preferably over the virtual light valve opening on the projection lens nearest the film to provide a graded light transmission by exposing varying lengths of aperture or varying light wedge transparency for the various lateral positions of the light valve ribbon or its image. A suitable diaphragm or screen may be made by photographing down properly shaped saw tooth edges and placing the resultant photograph over the actual or the virtual light valve jaws. By this means the first part of the travel of the light valve ribbon exposes the film less than would normally be the case, and thus produces a characteristic in which the exposure increases more rapidly than the current through the light valve ribbon. The exact form of the aperture in the diaphragm or screen must be such that when the light valve current and the receiving end lamp are adjusted to give white and black on the exposed film for clear film and entire opacity, respectively, at the sending end, the intermediate tones will be exact copies of those of the sending film. It will then be possible to reproduce a negative as a correct printing negative and a positive as a positive ready for viewing or copying.

Some of the general features of the invention have been broadly outlined above. Further objects and features will appear and a better understanding of typical embodiments will be had from the following detailed description in connection with the accompanying drawings.

Referring to the drawings.

Figure 1:
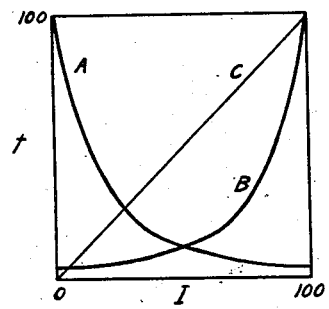
Fig. 1 is a set of curves showing characteristics of photographic action.

A picture transmission system, in order to receive a facsimile reproduction, must be so set up that the current delivered to the light valve increases with decreasing illumination of the photoelectric cell and vice versa, and when so set up the pictures may be transmitted so that the blacks are received as blacks and the whites as whites. However, in the usual transmission system having a strictly linear characteristic, the intermediate tones are badly distorted. This is shown diagrammatically in Fig. 1 where the illumination of the photoelectric cell which corresponds to the brightness of the original object is given by the abscissæ I and the transmitting or reflecting power of the photographic impression obtained is shown by the ordinate $t$. Curve A shows the transmission, with the ordinary arrangement of the apparatus, of the developed film at the receiving end, and curve B shows the transmission of the received film when the polarity of the photoelectric cell is reversed. The lights and the darks for the curve B are the reverse of those for the curve A. It will be seen that in curve B the relationship between exposure and transmission is a steeply descending curve instead of the straight line C which is required for truthful reproduction. It may be pointed out that photographic characteristics are usually plotted in the logarithmic form proposed by Hurter and Driffield, and when so plotted appear as straight lines. This method of plotting tends to obscure the fact, which is of significance for the present purpose, that the actual relation, for a single photographic operation, is represented, on a linear scale, as a pronounced curve, as shown in Fig. 1. The result of this is that there is rapid increase in density in the tones very near white, and that the dark tones are all practically indistinguishable. The characteristic as shown in either curve A or B varies with the exposure and development but always has the general form shown. In ordinary photography the medium on which a print is made has a similar characteristic, so that by matching or opposing two characteristic curves, truthful reproduction is attained upon the completion of the two operations of negative and print making. In order, for the purpose of single operation picture transmission, to correct the characteristic from the form shown in curve B into a correct linear characteristic as shown by the straight line C, it is necessary to introduce in the system a compensating distortion. This can be brought about in the electrical system but this invention accomplishes it entirely by alterations in the optical system. The specific means consists in the introduction of special diaphragms or screens covering the light valve aperture. As already pointed out the practicability of using special apertures in this way is greatly facilitated by the use of an optical system in which the jaws of the light valve have been removed from the immediate proximity of the light valve ribbon to a point in space where an enlarged image of the ribbon is formed.

Figure 6:
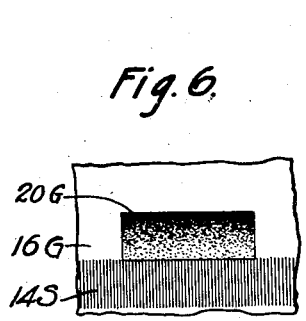
Fig. 6 shows a special light wedge screen applicable to a direct current light valve.
Figure 2:
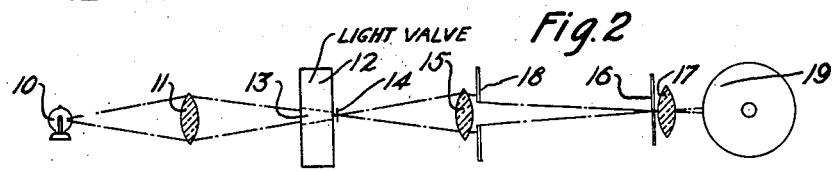
Fig. 2 is a diagrammatic representation of an optical system employed at the receiving station in a picture transmission system.
Figure 5:
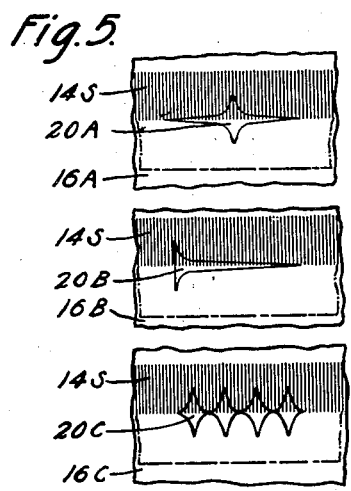
Fig. 5 shows types of special screens or apertures applicable to an alternating current light valve.
Figure 4:
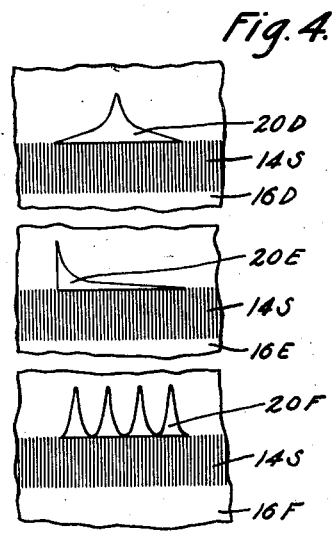
Fig. 4 shows types of special screens or apertures applicable to a direct current light valve.

An optical system, adapted to the reception of pictures in accordance with this system is diagrammatically shown herein in Fig. 2. In this figure 10 is the light source, 11 is a condensing lens, 12 is the body of the light valve, 13 is the opening through the light valve, 14 is the light valve ribbon, which lies horizontally, 15 is a lens which forms an enlarged image of the ribbon on the special aperture 16 positioned as nearly as practicable in the image plane of the lens 15 and in front of the lens 17 which in turn forms an image of the rectangular aperture 18 on the film 19. Types of screens which may be used at 16 are shown in Figs. 4, 5 and 6. With this optical system an image of the aperture 18 of fixed and constant size falls on the film with a brightness which depends upon the exposure through the apertures 16. This in turn is determined by the size of the image of the ribbon which falls across it. By proper adjustment, the ribbon image may be made to just cover the aperture 16 when the ribbon is stationary so that the edges of the aperture become virtually the light valve jaws of the usual rectangular light valve construction. In this arrangement, diaphragms or screens of various shapes or distributors of density forming the aperture 16 alter the amount of light falling on the film for the various positions of the ribbon image, but do not alter the shape of the image formed by the aperture 18 and focused on the film.

Figure 3:
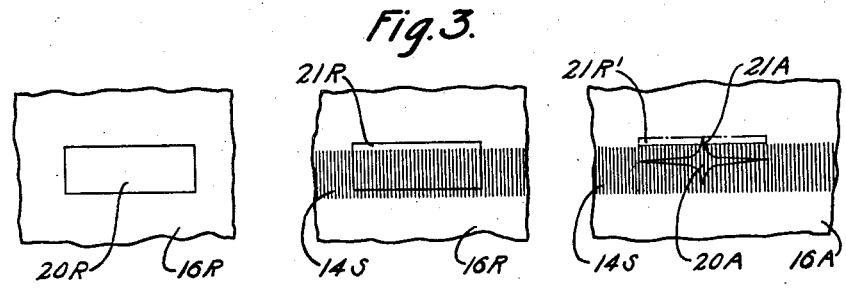
Fig. 3 shows the light valve opening and ribbon image thereon.

The light valve opening and the action of the ribbon is illustrated in Fig. 3. In the optical system here shown, as previously stated, the jaws of the light valve are removed from the immediate proximity of the light valve ribbon to a point in space where an enlarged image of the ribbon is formed and it is at this point that the special diaphragm or screen is positioned. The ordinary screen of opaque material 16R having a rectangular aperture 20R is shown in Fig. 3 at the left. The middle figure shows the screen 16R with a rectangular aperture and the image 14S of the light valve ribbon across it in a position partially opening the valve as shown by the opened area 21R. With the ordinary type of valve having a rectangular aperture the opening is obviously proportional to the displacement of the ribbon or its image. At the right in Fig. 3 is shown a special diaphragm or screen 16A having an aperture 20A so shaped that the amount of light allowed to pass increases rapidly up to the point of maximum exposure, the exposed area of the aperture being such that it is in general proportional to the reciprocal of the displacement of the light valve ribbon. The amount of displacement of the ribbon or its image 14S is the same as shown in the middle drawing but the actual opening 21A is much smaller than the rectangular aperture 21R or its outline as indicated at 21R' on 16A.

Fig. 4 shows a number of typical diaphragms or screens applicable to a direct current light valve and Fig. 5 those for an alternating current valve. Fig. 6 shows a special light wedge applicable to a direct current valve. In the direct current valve the ribbon has an amplitude of vibration from one edge of the aperture to the other, while in the alternating current valve the ribbon has an amplitude of vibration symmetrical with the center line of the aperture, one-half the total width of the aperture on each side. In each of these figures the shaded portion, designated by 14S, represents the image of the light valve in the position of maximum opening. The dot and dash lines show the image of the light valve ribbon in its extreme position in the other direction. In Fig. 4, 16D shows a screen having a symmetrical aperture 20D, 16E shows a modified aperture 20E, and 16F shows a further modification comprising a plurality of apertures 20F which have the appearance of saw teeth. In Fig. 5, 16A shows a screen having a symmetrical aperture 20A, 16B shows a modified aperture 20B, and 16C shows a plurality of apertures 20C which have the appearance of a double set of saw teeth. In Fig. 6, 16G shows a screen having a light wedge aperture or area 20G of varying transparency or light transmitting power. This type of screen while shown for a direct current light valve may be readily adapted to an alternating current valve. In all cases the various kinds of screens are designed to pass increasing or decreasing increments of light per unit of movement of the light valve ribbon and thus by optical means substantially compensate for distortion in the photographic process. The general characteristics of the screens are such that the passage of light is approximately proportional to the reciprocal of the displacement of the light valve ribbon.

In view of the fact that the shape of the photographic characteristic, as shown by the curves in Fig. 1, varies with the exposure and development, it is necessary to adopt a definite film emulsion, exposure, and development, and fit the special screen to these conditions. A fairly fast emulsion of considerable latitude such as commercial ortho film is satisfactory. For such a film, diaphragms or screens having apertures of substantially the shapes shown in Figs. 4 and 5 or equivalent light wedge screens as shown in Fig. 6 provide the necessary correction to produce facsimile reproduction.

With the present form of alternating current light valve, it is difficult to secure a complete correction of the characteristic down to the low transmission values because of the sinusoidal vibrations of the light valve ribbon whereby the amount of light contributed by the center portion of the light valve aperture, that is, the extreme excursion of the ribbon, is relatively small. It is just this portion which must be exaggerated by the screen and consequently an extreme distortion of the transmission characteristic of the light valve aperture is demanded. The problem is simpler if a direct current light valve is used actuated by current which has been put through an appropriate filtering system so that the entire opening of the light valve is uniformly illuminated.

This invention provides for substantially compensating the distortions in the photographic process, inherent in a single photographic operation, by means of a special screen over the light valve thereby making possible the reception of facsimile reproduction. The distortions it corrects must not be confused with those caused by unskilled manipulation in ordinary photography, such as under or over exposure, or incorrect development. The electrical picture transmission system offers possibilities of photographic printing operations in which the ordinary general reciprocal relation between negative and positive does not hold and this invention makes use of certain of these possibilities.

The invention disclosed is obviously susceptible to modifications and adaptations without departing from the spirit and scope of the invention and it is not intended to limit the invention to the specific construction shown and described except as defined by the scope of the appended claims.

What is claimed is:

1. In a picture transmission system, a receiving device including a light valve, and means associated with the light valve for governing the light controlling characteristic thereof to compensate for the distortion in a picture to be transmitted due to the non-complemental relationship of the corresponding tone values of the subject and of the picture produced by an odd number of stages of the photographic process.

2. In a picture transmission system, a picture receiving mechanism including a light valve, and optical means associated with said valve for governing the light controlling characteristic thereof to introduce into the received picture a distortion which compensates for the distortion in a picture to be transmitted due to the non-complemental relationship of the corresponding tone values of the subject and of the picture produced by an odd number of stages of the photographic process.

3. In a picture transmission system, a picture receiving mechanism including a light controlling device, and a member associated with said device and having an aperture for introducing into the received picture a distortion which compensates for the photographic distortion in a picture to be transmitted due to the non-complemental relationship of the corresponding tone values of the subject and of the picture produced by an odd number of stages of the photographic process.

4. In a picture transmission system, a picture reproducing device including a light valve, and means associated with said valve for governing the light controlling characteristic thereof to enable the reproduction of a negative from a negative by compensating for the photographic distortion in a picture to be transmitted due to the non-complemental relationship of the corresponding tone values of the subject and of the picture produced by an odd number of stages of the photographic process.

5. The combination in a system for the electrical transmission of pictures, of a picture reproducing device for enabling the direct reproduction of negatives from negatives and positives from positives including optical means for compensating for the photographic distortion in a picture to be transmitted due to the non-complemental relationship of the corresponding tone values of the subject and of the picture produced by an odd number of stages of the photographic process.

6. In a picture transmission system, a light valve including an aperture the opening of which may be varied by a movable element, and optical means associated with the light valve to compensate for photographic distortion in a picture to be transmitted due to the non-complemental relationship of the corresponding tone values of the subject and of the picture produced by an odd number of stages of the photographic process, said means comprising a screen of such varying light transmitting power that when exposed by the light valve the said screen passes light in an amount substantially proportional to the reciprocal of the displacement of the movable element of the light valve.

7. In a picture transmission system, a receiving device including a light valve having an opening which may be varied by an electric current carrying a movable element, and optical means associated with the light valve to compensate for photographic distortion, said means comprising an apertured screen, the contour of the said aperture being such that the aperture when opened by the light valve permits the passage of light substantially proportional to the reciprocal of the current passing through the movable element of the light valve.

8. In a picture transmission system, receiving apparatus comprising a light source, a light valve, a screen of varying light transmitting power, a lens for forming an image of the light valve upon said screen, a receiving element, a second screen, a second lens adjacent said first screen for forming an image of the aperture in the second screen upon said element, the light transmitting power of said first screen when cooperating with said valve being such as to compensate for the photographic distortion inherent in a single photographic operation.

9. In a picture transmission system, a receiving device including a light valve having jaws, means for producing a virtual image of the jaws of said valve, and optical means associated with the virtual image of the jaws of the light valve to compensate for photographic distortion.

10. In a picture transmission system, a receiving device including a light valve having an aperture which may be opened varying amounts by a movable element, and optical means associated with the light valve to compensate for photographic distortion, said means comprising an apertured screen, the contour of the said aperture being such that the rate of opening when the light valve is being opened is substantially the reciprocal of the displacement of the movable element of the light valve.

In witness whereof, I hereunto subscribe my name this 23 day of March A. D., 1926.

HERBERT E. IVES.